United States Patent
Shim

[11] 3,890,411
[45] June 17, 1975

[54] PROCESS FOR FORMING PHOSPHORUS CONTAINING POLYMERS

[75] Inventor: Kyung Sup Shim, Irvington, N.Y.

[73] Assignee: Stauffer Chemical Company, Westport, Conn.

[22] Filed: Feb. 14, 1974

[21] Appl. No.: 442,569

[52] U.S. Cl. ................ 260/969; 260/928; 260/937
[51] Int. Cl. ............................................ C07f 9/40
[58] Field of Search ........................... 260/928, 969

[56] References Cited
UNITED STATES PATENTS
2,893,961  7/1959  McManimie ...................... 260/969
3,152,164  10/1964  Oswald .......................... 260/928 R
3,298,967  1/1967  Mason ............................ 260/2 P OTHER PUBLICATIONS
Shimidzu et al., "J. Polymer Sci. B.," Vol. 3, pp. 871–873, (1965).

Primary Examiner—Anton H. Sutto

[57] ABSTRACT

A process for forming compounds of the formula

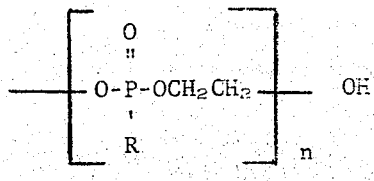

where R is selected from the group consisting of methyl and ethyl and $n$ varies between 2 and 300 or more which comprises heating a compound of the formula

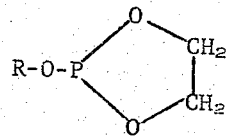

wherein R has the same meaning set forth above to a temperature of from about 100°C to about 250°C in the presence of a catalytic amount of a lower alkylene glycol and a halide rearrangement catalyst.

9 Claims, No Drawings

PROCESS FOR FORMING PHOSPHORUS CONTAINING POLYMERS

This invention relates to phosphorus-containing polymers. More particularly, it relates to a process for making such polymers by the intramolecular rearrangement and polymerization of cyclic phosphite glycol esters.

The present invention is a process for forming phosphoruscontaining polymers having a repeating unit of the formula

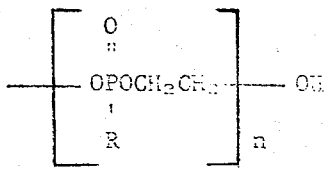

where R is selected from the group consisting of methyl and ethyl and $n$ is an integer which ranges between 2 and 300 or more, which comprises heating a phosphorane compound having the formula

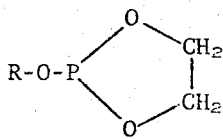

where R has the meaning set forth above, to a temperature of from 100°C to 250°C in the presence of a catalytically effective amount of a lower alkylene glycol and a halide rearrangement catalyst, i.e., an Arbuzov rearrangement catalyst. A preferred starting compound for use is methoxyphosphorane, i.e. when R is methyl. The product formed when this starting reagent is chosen is the methyl phosphonate ester of ethylene glycol, i.e. polyethylene methylphosphonate (also known as PEMP). PEMP is a known compound and has been described in the literature, e.g., in U.S. Pat. No. 2,893,961 to McManimie, as having fire retardant properties. A number of methods for its formation have been advocated.

The transesterification of ethylene glycol with phosphoric acid esters, e.g. Petrov et al., Chemical Abstracts, 59, 4048g (1963) and the transalkylation of bis (2-chloroethyl) methylphosphonates, e.g. Korshak et al., Chemical Abstracts, 52, 12804e (1958) are two examples of reaction schemes originally reported in the foreign scientific literature for forming PEMP. The thermal polymerization of 2-methyl-2-oxo-1,3,2-dioxaphosphorane has also been suggested, e.g. V. V. Korshak et al., Chemical Abstracts 51, 14621g (1957), V. V. Korshak, J. Polymer Sci., 31 319 (1958), and T. Schimidzu et 21., J. Polymer Sci., B3, 871 (1965).

Other recent reaction schemes are suggested in a number of U.S. Patents. Mange U.S. Pat. No. 3,578,731, for example, reacts diols with either bifunctional phosphorus-containing acids or derivatives thereof which can form linear polyesters. McManimie U.S. Pat. No. 2,893,961 uses the thermal catalytic polymerization of cyclic phosphite glycol esters in the presence of either Friedel-Crafts or organometallic halides and Mason U.S. Pat. No. 3,298,967 discloses a similar type of process utilizing cyclic phosphonate monomers. Although these processes can be used to produce a PEMP product which is free of hydrolyzable chlorine they require the use of special and rather expensive catalysts.

The present invention comprises a process for polymerizing a cyclic phosphite glycol ester in the absence of organometallic catalysts which comprises heating the phorphorane set forth in formula II, above, to a temperature in the range of about 100°C to about 250°C in the presence of a catalytic amount of a lower alkylene glycol and of a halide rearrangement catalyst.

The phosphorane compound which is used as the starting reagent may be prepared by any means to those in the art. A preferred reaction scheme for preparation of methoxyphosphorane is, for example, given in Example 1 and comprises the reaction of trimethyl phosphite and ethylene glycol in the presence of sodium methoxide. Other suitable reaction schemes for forming the desired phosphorane starting reagent would be suggested by an examination of U.S. Pat. Nos. 2,893,961, 2,382,622 and 3,298,967, as well as other scientific references.

The amount of catalyst, i.e. lower alkylene glycol and halide rearrangement catalyst, which are used can range between 0.1% and 3% by weight of the weight of phosphorane starting material. The amount utilized is preferably below 1% by weight and contains a major portion of halide rearrangement catalyst compared to alkylene glycol. Generally only one drop of glycol will be added. Preferred alkylene glycols are ethylene and propylene glycol.

The halide rearrangement catalyst preferably is a $C_1$-$C_9$ alkyl bromide, chloride, or iodide. These include methyl iodide, ethyl iodide, methyl bromide, butyl iodide, butyl chloride, nonyl bromide and octyl iodide. Arylhalides which can be used include benzyl bromide, benzyl iodide, chloromethylnapthalene, triphenylbromomethane, and the like. Methyl iodide is the most preferred halide reagent. Other halide or Arbuzov rearrangement catalysts include elemental iodide, which is included within the term "halide" for purposes of this application, and alkali metal halides, such as sodium iodide, potassium iodide, potassium fluoride, sodium bromide, lithium iodide, and the like. Any catalytically effective amount of the halide rearrangement catalyst may be employed, and it (and the alkylene glycol) are generally present in the range of from about 0.05% to about 3% by weight of the starting reagents. Preferably from about 0.1% to about 0.2% by weight is used.

The temperature of the reaction mixture ranges from about 100° to 250°C, preferably 120° – 201°C over a period of about three hours or longer. If desired, the polymerization can be carried out at elevated pressure to prevent loss of the reagents.

The process of the present invention will be further illustrated by the following examples:

EXAMPLE 1

To a two liter flask equipped with a mechanical stirrer, distillation head and thermometer were added 744 g of trimethyl phosphite, $(CH_3O)_3P$, 372 g of ethylene glycol and 1.5 g of sodium methoxide. The mixture was allowed to age overnight after being stirred for 15 minutes. The mixture was heated slowly to about 95°C (pot temperature) and 60°C (distillation head temperature) until refluxing began. The heat was then lowered to about 67°–77°C at which time volatile methanol was collected. Approximately 396 grams of volatiles were collected before the aspirator was activated. Stripping occurred at about 60°C. The pot residue contained the desired product.

EXAMPLE 2

One hundred twenty-two grams of methoxyphosphorane from Example 1, 1 gram of methyliodide and one drop of ethylene glycol were placed in a 250 ml flask equipped with thermometer, stirrer and condenser. This mixture was heated at 120°C and began to reflux. The pot temperature began to rise slowly to 201°C over a period of 3 hours. A clear colorless liquid was obtained after stripping under aspirator pressure at about 60°C. The Acid No. was 8.65 and the IR showed absorption at 290 $cm^{-1}$.

This liquid was treated with 3g of propylene oxide at 90°C for an hour to reduce residual acidity and was stripped at 90°C/0.05mm. The yield of product was 105 g, had an acid number of 2.8 and showed IR absorption at 291 $cm^{-1}$.

What is claimed:

1. A process for forming a polymer having a repeating unit of the formula

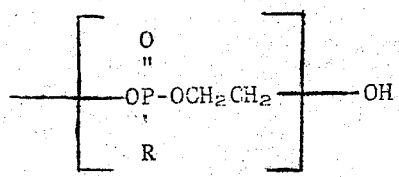

where R is selected from the group consisting of methyl and ethyl which comprises the heating of a phosphorane compound of the formula

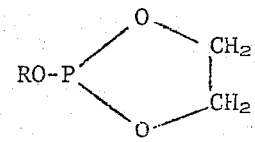

where R has the same meaning set forth above, to a temperature of 100°C to 250°C in the presence of a catalytically effective amount of a lower alkylene glycol and a halide rearrangement catalyst.

2. A process as claimed in claim 1 wherein the lower alkylene glycol is selected from the group consisting of ethylene glycol and propylene glycol.

3. A process as claimed in claim 1 wherein the lower alkylene glycol is ethylene glycol.

4. A process as claimed in claim 1 wherein the halide rearrangement catalyst is a $C_1$-$C_9$ alkyl halide.

5. A process as claimed in claim 4 wherein the alkyl halide is methyl iodide.

6. A process as claimed in claim 1 wherein the phosphorane compound is heated to a temperature ranging between about 120°C to 201°C.

7. A process as claimed in claim 1 wherein the amount of halide rearrangement catalyst and alkylene glycol ranges from about 0.1% to 3.0% of the weight of phosphorane compound.

8. A process as claimed in claim 1 wherein the amount of halide rearrangement catalyst and alkylene glycol ranges between about 0.1% and 0.2% by weight of the phosphorane compound.

9. A process as claimed in claim 1 wherein the polymer has between 2 and 300 repeating units.

* * * * *